United States Patent
Chwastiak et al.

[11] Patent Number: 5,871,685
[45] Date of Patent: Feb. 16, 1999

[54] METHOD OF BURNISHING BRAKE PADS

[75] Inventors: Stephen Chwastiak, Charlotte, N.C.;
Jens H. S. Lamba, Clover, S.C.;
Donald L. Burgoon, Gastonia, N.C.

[73] Assignee: Performance Friction Corp., Clover, S.C.

[21] Appl. No.: 390,534

[22] Filed: Feb. 17, 1995

[51] Int. Cl.⁶ .................................................. B29C 71/00
[52] U.S. Cl. .................. 264/446; 264/40.1; 264/234; 264/482; 29/90.1
[58] Field of Search ...................... 264/400, 446, 264/482, 406, 40.1, 234; 29/90.1

[56] References Cited

U.S. PATENT DOCUMENTS

| | | | |
|---|---|---|---|
| 4,212,900 | 7/1980 | Serlin | 427/53.1 |
| 4,514,613 | 4/1985 | Hill et al. | 219/121 E |
| 5,141,083 | 8/1992 | Burgoon | 188/73.1 |
| 5,231,861 | 8/1993 | Tokumura et al. | 72/340 |
| 5,359,173 | 10/1994 | Opdyke | 219/121.69 |

FOREIGN PATENT DOCUMENTS

| | | |
|---|---|---|
| 58-219241 | 12/1983 | Japan . |
| 63-176834 | 7/1988 | Japan . |

OTHER PUBLICATIONS

David T. Patten, "Laser Surface Conditioning of Semimetallic Friction Materials", SAE Technical Paper Series, Intl. Congress and Exposition, Detroit, Michigan Feb. 24–28, 1985, pp. 1–5.

Primary Examiner—Christopher A. Fiorilla
Attorney, Agent, or Firm—Cushman Darby & Cushman Intellectual Property Group of Pillsbury, Madison & Sutro, LLP

[57] ABSTRACT

Provided is a fast and efficient method of burnishing a brake pad. The brake pad is contacted with a heat source having a power density greater than about 270 Mw/m². Also provided is pre-burnished brake pad having an increased coefficient of friction.

22 Claims, 3 Drawing Sheets

FIG. 4 ium power laser (less than 100 Mw/m²) is preferred because it
METHOD OF BURNISHING BRAKE PADS

BACKGROUND OF THE INVENTION

1. Field of the Invention

This invention relates to a method of burnishing brake pads, and more particularly, to a method of burnishing brake pads using a high intensity heat source. The invention also relates to a pre-burnished brake pad.

2. Description of Related Art

New brake pads have a low coefficient of friction, typically less than 75% of a burnished pad. To increase the coefficient of friction, the new brake pads require a break-in treatment, otherwise known as a burnish, which consists of several hard stops before the coefficient of friction increases to a stable level, otherwise known as the steady state.

The ability of vehicle drivers to carry out a successful break-in varies widely. Therefore, automobile manufacturers prefer that the brake pads be pre-burnished to increase the coefficient of friction before they are mounted on the vehicles.

Conventional methods of pre-burnishing include burnishing the brake pads on a brake dynamometer by engaging the brake pads onto a rotor therebetween, flame scorching, and searing on a hot plate. These types of pre-burnishing treatments are not precise and are very inefficient and costly.

The article entitled "SAP Technical Paper Series" by David T. Patten in the *SAP The Engineering Resource For Advancing Mobility*, Feb. 24–28, 1986 discloses that lasers with a power source up to 100 Mw/m² have been used unsuccessfully to pre-burnish brake pads. The increase in friction provided by applying a laser having less than 100 Mw/m² only provides an increase in the coefficient of friction of 20%. This article further teaches that a medium power laser (less than 100 Mw/m²) is preferred because it provides a 20% increase over a high power laser (less than 100 Mw/m² but greater than the medium power laser) which only provides a 17% increase in the coefficient of friction.

There is a great need for a simple and fast method of pre-burnishing brake pads which increases the coefficient of friction by at least 25% over the initial coefficient of friction, or which increases the coefficient of friction to an adjustable level of desired initial friction to within about 15% of the long-term steady-state coefficient of friction.

SUMMARY OF THE INVENTION

An object of the present invention is to provide a simple and fast method of pre-burnishing brake pads to increase the coefficient of friction by at least 25% over the initial coefficient of friction, or to increase the coefficient of friction to an adjustable level of desired initial friction to within about 15% of the long-term steady-state coefficient of friction.

Another object of the invention is to provide a pre-burnished brake pad having a coefficient of friction which is at least 25% greater than the initial coefficient of friction or which has been increased to within about 15% of the long-term steady-state coefficient of friction.

The invention relates to a method of burnishing a brake pad comprising the steps of contacting a braking surface of the brake pad with a heat source having a power density of greater than about 270 Mw/m².

The invention also relates to a pre-burnished brake pad comprising a friction surface which has been burnished using a heat source having a power of at least about 270 Mw/m² wherein the friction surface has at least a 25% increase in the coefficient friction over a non-burnished friction surface, or an increase in the coefficient of friction to within about 15% of the long-term steady-state coefficient of friction.

DETAILED DESCRIPTION OF THE PREFERRED EMBODIMENTS

The invention relates to a method of burnishing a brake pad comprising the steps of contacting a braking or friction surface of the brake pad with a heat source having a power density greater than about 270 MW/m² to thereby increase the coefficient of friction of the brake pad by at least 25%, or to increase the coefficient of friction to an adjustable level of desired friction to within about 15% of the long-term steady-state coefficient of friction.

Preferably, the brake pad is a metallic brake pad containing resinous binder and other carbon ingredients capable of being oxidized or carbonized.

Preferably, the heat source has a power density in the range of about 270 to about 700 Mw/m², more preferably about 270 to about 500 Mw/m², and most preferably about 300 to about 400 Mw/m².

Any heat source can be used which can be controlled to provide the proper power density. Preferably, the heat source is capable of being collimated to provide a high degree of control. More preferably, the heat source comprises a laser, for example, a laser having a power output of 3 Kw or greater, such as a 5 kw $CO_2$ laser.

Preferably, the heat source is applied such that the coefficient of friction of the brake pad is increased by at least 50%. More preferably, the heat source is applied such that the coefficient of friction of the brake pad is increased to within about 10% of the long-term steady-state coefficient of friction.

The absolute values of the coefficient of friction for brake pads is dependent on the measuring methods used. Thus, the same brake pad can have a very wide range of coefficients of friction when measured by different methods. In light of this variance in absolute values, this invention has been described in terms of increases in the coefficient of friction from the initial coefficient of friction.

As a brake pad is used, for example, in an automobile, the coefficient of friction of the friction surface will conform to a steady state. For example, in an E150 Ford type 1994 brake pad, the steady state coefficient of friction is about 0.3, as measured using the apparatus described in the following Examples. Preferably, the power density of the source is selected such that the initial coefficient of friction of the brake pad is increased to be about equal to the steady state coefficient of friction for the brake pad. For example, if the initial coefficient of friction of a friction surface is about 0.2 and the steady state coefficient of friction is about 0.3, a power density preferably should be selected that increases the coefficient of friction by 50% ((0.3–0.2)/0.2×100%).

Figure 2:
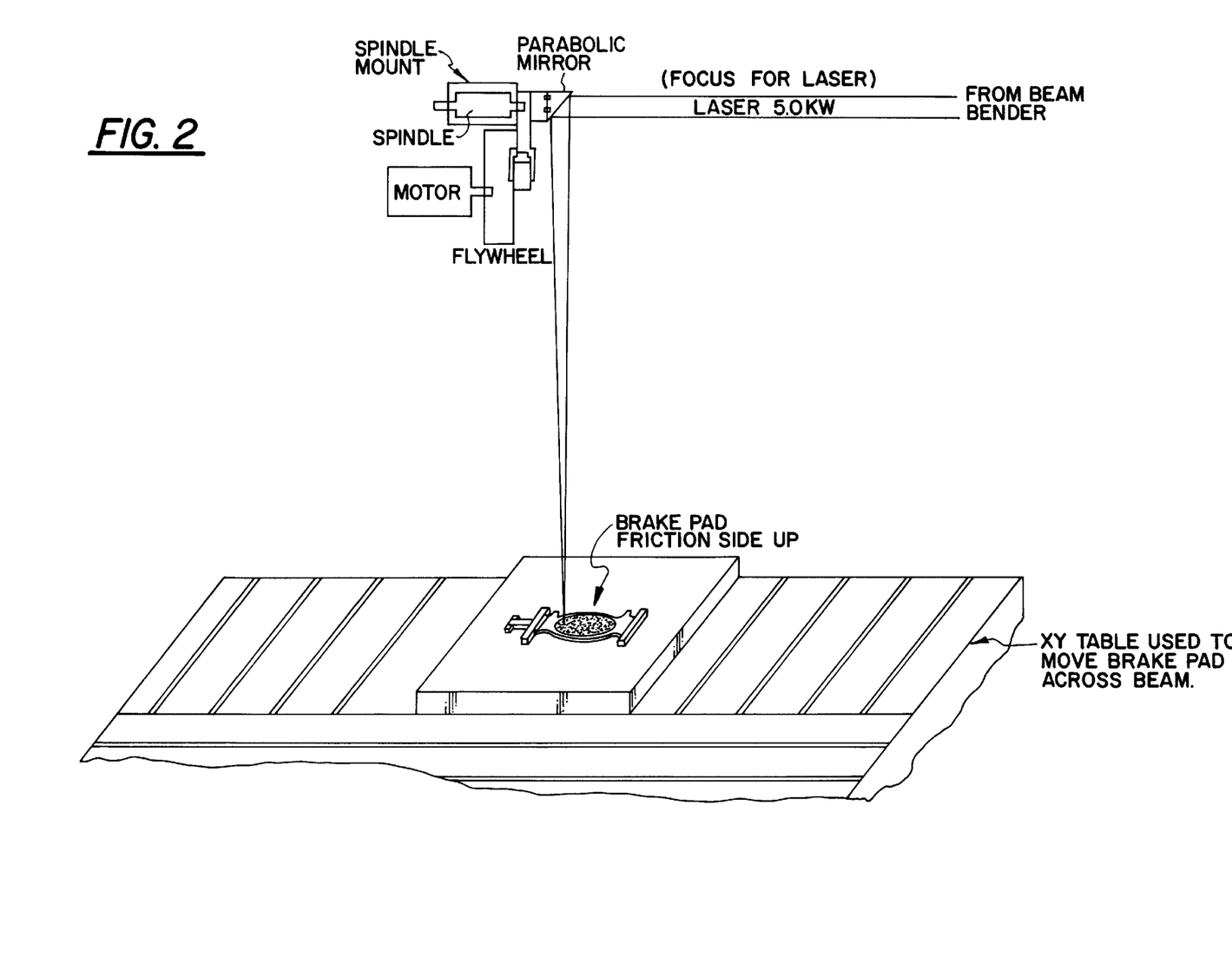
FIG. 2 illustrates a preferred method of burnishing a brake pad using a laser.

The friction surface of a brake pad can be burnished, for example, by rastering a laser beam having the required power density over the friction surface, as shown in FIG. 2. The amount of time the high energy beam is applied to the friction surface of the brake pad will vary depending on the power density and the type of brake pad material.

If a metallic brake pad is used, preferably, the heat source is applied for a sufficient amount of time to provide a burnished layer having a thickness of about 20 microns to about 40 microns, more preferably about 25 microns to about 40 microns, and most preferably about 30 microns to about 35 microns. These values can vary, depending on the intended use. This form of pre-burnishing provides excellent results and is very fast. For example, to provide the above thickness of the burnished layer, the friction surface of the brake pad can be moved relative to the heat source at a rate of about 300 to about 400 inches per minute.

The invention also relates to a pre-burnished brake pad comprising a friction surface which has been burnished using a heat source having a power density greater than about 270 Mw/m$^2$, wherein the friction surface has an increase in friction over a non-burnished friction surface of at least 25%, or which has been increased to about 15% of the long-term steady-state coefficient of friction.

In a preferred embodiment, the pre-burnished brake pad comprises a friction surface which has been burnished using a heat source having a power density of about 270 to about 700 Mw/m$^2$, wherein the friction surface has an increase in friction over a non-burnished friction surface of at least 25%, and more preferably at least 50%. Most preferably, the coefficient of friction of the friction surface is increased to within about 10% of the long-term steady-state coefficient of friction.

Preferably, but depending upon the intended application and use, the pre-burnished brake pad has a burnished layer having a thickness of about 20 microns to about 40 microns, more preferably about 25 microns to about 40 microns, and most preferably, about 30 microns to about 35 microns.

EXAMPLES

The invention will be further explained by the following non-limiting examples.

In each of the following Examples and Comparative Examples, 1994 Ford F150 commercial semi-metallic brake pads were used. The increase in the coefficient of friction for the tested brake pads was measured using an Econoline front brake spindle assembly on an inertial brake dynamometer, with an initial load of 2.37 slug—ft$^2$. The dynamometer was run under various combinations of pressure stops ("Effectiveness"), different speeds, initial brake temperatures and fade conditions. The PFC DEV.01 dynamometer test procedure, shown in Table 1, was applied through the first subtest routine to measure the friction behavior the brake pads using the 1st to the 3rd Effectiveness. PFC DEV.02 dynamometer test procedure, as shown in Table 2, was used through the 1st Effectiveness to measure the coefficient of friction.

The calculation of the magnitude of the coefficient of friction from torque and applied pressure requires an assumption of brake geometry. The appropriate values for brake parameters depend on individual assessment of the appropriate geometric dimensions, therefor more weight has been given to percent increases in the coefficient of friction due to changes in pre-burnish treatments than to the absolute magnitudes of the calculated coefficient of friction.

TABLE 1

| Sec. | Cyl. | IS | ES | IP | PIC | DC | IBT | AV | Ctr'T | Name |
|---|---|---|---|---|---|---|---|---|---|---|
| 1 | 3 | 31 | 0 | 200 | 0 | 0 | 100 | 60 | rotor | 1st eff 31 100° F. |
| 2 | 7 | 31 | 0 | 200 | 200 | 0 | 500 | 60 | rotor | 1st eff 31 500° F. |
| 3 | 7 | 62 | 0 | 200 | 200 | 0 | 500 | 60 | rotor | 1st eff 62 500° F. |
| 4 | 6 | 60 | 0 | 0 | 0 | 15 | 0 | 20 | rotor | burnish |
| 5 | 7 | 31 | 0 | 200 | 200 | 0 | 500 | 60 | rotor | 2nd eff 31 500° F. |
| 6 | 7 | 62 | 0 | 200 | 200 | 0 | 500 | 60 | rotor | 2nd eff 62 500° F. |
| 7 | 1 | 62 | 0 | 0 | 0 | 15 | 250 | 20 | rotor | 1st fade |
| 8 | 9 | 62 | 0 | 0 | 0 | 15 | 0 | 20 | rotor | 1st fade |
| 9 | 1 | 62 | 0 | 0 | 0 | 15 | 250 | 20 | rotor | 2nd fade |
| 10 | 14 | 62 | 0 | 0 | 0 | 15 | 0 | 20 | rotor | 2nd fade |
| 11 | 7 | 31 | 0 | 200 | 200 | 0 | 500 | 60 | rotor | 3rd eff 31 500° F. |
| 12 | 7 | 62 | 0 | 200 | 200 | 0 | 500 | 60 | rotor | 3rd eff 62 500° F. |

Repeat 5 times for complete test.
Sec. = Section of test
Cyl. = Number of cycles under parameters for a particular test
IS = Initial speed (m.p.h.)
ES = Final speed (m.p.h.)
IP = Initial pressure (p.s.i.)
PIC = Pressure increment increase for successive cycles within a section (p.s.i.)
DC = Deacceleration for torque controlled stops (ft./sec.$^2$)
AV = Air velocity for cooling between stops (m.p.h.)
Ctr'T = Temperature controlled by thermocouple placed in rotor or in brake pad, as indicated
IBT = Initial Brake Temperature (°F.)

TABLE 2

| Sec. | Cyl. | IS | ES | IP | PIC | DC | IBT | AV | Ctr'T | Name |
|---|---|---|---|---|---|---|---|---|---|---|
| 1 | 7 | 31 | 0 | 100 | 200 | 0 | 122 | 60 | rotor | 1st eff 31 122° F. |

Example 1

A 5 kW carbon dioxide laser was used as the heat source. A scanner mechanism shown at 12 rastered the beam at 100 kHz over the face of the friction pad shown at 10 while it moved lengthwise, through the plane of the beam, at 100 to 120 inches per minute, as shown in FIG. 2. The edges of the pad surface were masked to eliminate over-treatment in the area where the scanner changed beam direction; thus only a one inch strip was pre-burnished, covering approximately 57% of the pad surface.

One pair of the brakes was tested by dynamometer procedure PFC DEV.02. These pads had been subjected to 5 kw power (4.6 kw at the work face), with the beam focused 1 in. above the work face, and rastered at 100 kHz. The laser beam spot size was about 0.13 in. diameter, translating into a power density of 540 Mw/m$^2$. The pads visually appeared burnished. The results are shown in Table 3. The results indicate that the coefficient of friction increased by more than 40% compared to the initial coefficient of friction before treatment, in the first stop. The friction gain was even more for the next six stops.

TABLE 3

| | 1st Effectiveness - 122° F. at 31 mph | | | | | | |
|---|---|---|---|---|---|---|---|
| Stop | 1 | 2 | 3 | 4 | 5 | 6 | 7 |
| Burnished pads, Coef. of Friction | 0.30 | 0.33 | 0.34 | 0.40 | 0.39 | 0.46 | 0.50 |
| Control pads, Coef. of Friction | 0.20 | 0.20 | 0.20 | 0.20 | 0.19 | 0.19 | 0.19 |
| Increase in Coef. of Friction (%) | 50 | 65 | 70 | 100 | 105 | 142 | 163 |

Example 2

The laser of Example 1 was used. The beam spot size was varied by moving the position of the friction surface of the brake pad relative to the focal point of the beam of the laser. The spot size was varied from 0.319 in. diameter at 3 in. from the focal point to 0.155 in. diameter at 1.22" from the focus position. By varying the power and the spot size, the power density at the friction surface ranged from 54 to 380 Mw/m$^2$. The coefficient of friction of these brake pads during the first effectiveness at 122° F. and 31 mph, as measured by dynamometer procedure PFC DEV.02, are shown in Table 4.

These results indicate that the initial coefficient of friction increased at least about 25% only when the power density was about 270 Mw/m$^2$ or greater. See FIG. 1 for the relationship between the increase in the coefficient of friction and the power density. A power density of 380 Mw/m$^2$ was higher than needed because the first stop exhibited coefficient of friction at a level of 0.4, much higher than the long term steady state level of approximately 0.3 friction units. Treatment of friction material with a power intensity of about 300 Mw/m$^2$ provides a coefficient of friction of 0.3, which is about equal to the steady state value of the pad, and is the most efficient level for this compound. In this particular example, the treatment was not very sensitive to feed rate over the range 300–400 ipm. The optimum power level for different friction compositions is expected to vary somewhat, depending on the post-burnish friction level of a particular friction compound.

Example 3

The effect of the laser beam scan rate was determined over the range 20 to 100 kHz, using the laser of Example 1. The power was kept at 5 kw and the feed rate at 400 ipm. With a spot size of 0.155", the power density was 388 Mw/m$^2$, well above the amount needed to pre-burnish friction material, as determined by Example 1.

The beam scan rate was varied from 20 to 100 kHz. At a feed rate of 400 ipm, the successive passes of the beam traverse the friction surface without overlap. At scan rates slower than 50 kHz, the successive beam paths leave a band of untreated surface between them; this was most noticeable at a scan rate of 20 kHz, where the pads became striped in appearance. The striped pads showed increased friction compared to pads treated with the beam overlapping. It seems that a second or overlapping treatment is not beneficial. This was confirmed by passing a pad through the treatment twice, in which no appreciable increases in the coefficient of friction occurred. However, too high a beam power density, such as about 710 Mw/m$^2$, might show some decrease in the coefficient of friction, depending on the type of friction material used.

The results from the first section of PFC DEV.02 friction test are shown in Table 5.

TABLE 4

Coefficient of Friction of Brake Pads Pre-burnished by a Laser over a Wide Range of Power Intensities

| POWER | FEED RATE ipm | BEAM SCAN kHz | FOCUS POINT DISTANCE in. | BEAM OVERLAP IN SCANNING % | POWER DENSITY Mw/m2 | COEF. OF[1] FRICTION RANGE |
|---|---|---|---|---|---|---|
| 5 | 300 | 100 | 1.22 | 57 | 380 | .42–.30 |
| 5 | 400 | 100 | 1.22 | 57 | 380 | .40–.30 |
| 4 | 350 | 100 | 1.22 | 57 | 302 | .28–.27 |
| 3 | 400 | 100 | 1.22 | 57 | 220 | .23–.22 |
| 3 | 300 | 100 | 1.22 | 57 | 220 | .22–.22 |
| 5 | 300 | 100 | 3 | 79 | 89 | .19–.25 |
| 5 | 400 | 100 | 3 | 79 | 89 | .18–.26 |
| 4 | 350 | 100 | 3 | 79 | 71 | .23–.20 |
| 3 | 300 | 100 | 3 | 79 | 54 | .22–.20 |
| 3 | 400 | 100 | 3 | 79 | 54 | .18–.20 |
| 0[2] | 0 | 0 | — | — | 0 | .17–.20 |

[1] 1st effectiveness- 122° F. at 31 mph.
[2] Control

TABLE 5

Friction Level of Brake Pads Pre-burnished by a
Laser at Various Beam Scan Rates
1st Effectiveness, 122° F. at 31 mph

| BEAM SCAN RATE kHz | SPOT DIAM. In." | POWER DENSITY Mw/m2 | COEFFICIENT OF[1] FRICTION RANGE |
|---|---|---|---|
| 20 | 0.155" | 380 | .36–.33 |
| 40 | 0.155" | 380 | .45–.37 |
| 60 | 0.155" | 380 | .30–.36 |
| 80 | 0.155" | 380 | 0.28–.32 |
| 100 | 0.155" | 380 | 0.29–0.31 |
| 100 (twice) | 0.155" | 380 | 0.34–0.30 |
| 100 | 0.113" | 710 | 0.30–0.26 |

[1]1st effectiveness - 122° F. at 31 mph, 7 stops.

Example 4

The long term effect of pre-burnishing according to the invention was investigated by studying pads treated by a laser at 5 kw power, 400 ipm feed rate, 60 kHz scan rate, with a beam spot size of 0.155" diameter, using the laser of Example 1. This corresponds to a 370 Mw/m$^2$ power density at the surface of the part. Treated brake pads and non-treated brake pads, both from the same production run, were tested on the dynamometer using test procedure PFC DEV.01.

The results are shown in Table 6. These results demonstrate that the treatment increased the coefficient of friction by an average of 27% in the first three stops compared to the control which was not pre-burnished. The effect of the pre-burnish decreased as the test progressed, so there was only 16% benefit for the first Effectiveness at 31 mph/500° F., and the benefit fell to only 8% for first Effectiveness at 62 mph/500° F. The natural burnishing of the brakes occurring during successive stops brought the control brake pad up to the same friction imparted by the laser treatment.

The long term effect of the pre-burnish treatment in the second and third Effectiveness is so small as to be negligible. The results are summarized in the Table 7.

TABLE 6

Comparison of Friction Levels of Pre-burnished Brake Pads and Control Brake Pads During Use.

| | STOP | | | | | | | |
|---|---|---|---|---|---|---|---|---|
| | 1 | 2 | 3 | 4 | 5 | 6 | 7 | Change, % |
| 1st Effectiveness (green) - 31 mph, 120° F. | | | | | | | | |
| Control, Coef. of Frict. | 0.19 | 0.20 | 0.20 | | | | | |
| Pre-burnish, Coef. of Friction | 0.23 | 0.25 | 0.27 | | | | | Average of 3 = + 27% |
| 1st Effectiveness - 31 mph, 500° F. | | | | | | | | |
| Control, Coef. of Frict. | 0.29 | 0.30 | 0.30 | 0.29 | 0.29 | 0.28 | 0.28 | |
| Pre-burnish, Coef. of Friction | 0.35 | 0.35 | 0.34 | 0.34 | 0.33 | 0.33 | 0.31 | Average of 7 = + 16% |
| 1st Effectiveness - 62 mph, 500° F. | | | | | | | | |
| Control, Coef. of Frict. | 0.28 | 0.27 | 0.26 | 0.25 | 0.24 | 0.24 | 0.23 | |
| Pre-burnish, Coef. of Friction | 0.31 | 0.30 | 0.29 | 0.28 | 0.26 | 0.26 | 0.23 | Average of 7 = + 8% |

TABLE 7

Long Term Average Coefficient of Friction of Brake Pads
Pre-burnished by a Laser

| | Control | Pre-burnish |
|---|---|---|
| 2nd Effect., 31 mph, 500° F. | 0.29 | 0.30 |
| 2nd Effect., 62 mph, 500° F. | 0.33 | 0.34 |
| 3rd Effect., 31 mph, 500° F. | 0.26 | 0.27 |
| 3rd Effect., 62 mph, 500° F. | 0.31 | 0.32 |

Comparative Example 1

Brake pads were treated in a Globar box furnace, with open SiC elements glowing at approximately 4700° F. The air temperature dropped rapidly as distance from the element increased, becoming about 2500° F. at 3" to 4" below the element. At this position, a brake pad took 19 minutes to reach 2300° F., as measured by a thermocouple imbedded within the friction. All of the resin appeared to be lost by that time. Pads were then exposed to this heat intensity for 15 seconds, 20 seconds, and 45 seconds. Visually none of the friction pads appeared to be burnished.

Results of friction tests on the 45 seconds sample, using PFC DEV.02 procedure, are shown in Table 8. This data shows that there was no increase in the coefficient of friction from heating in a Globar Furnace.

TABLE 8

Friction Level of Brakes Heated for 45 Seconds in a Globar
Furnace
1st Effectiveness - 122° F. at 31 mph

| | STOP | | | | | | |
|---|---|---|---|---|---|---|---|
| | 1 | 2 | 3 | 4 | 5 | 6 | 7 |
| Control pads, Coef. of Frict. | 0.18 | 0.19 | 0.19 | 0.19 | 0.19 | 0.19 | 0.19 |
| Heated pads, Coef. of Frict. | 0.20 | 0.20 | 0.20 | 0.20 | 0.19 | 0.19 | 0.19 |

Comparative Example 2

A portable IR lamp, producing 100 watt/in was used to burnish brake pads. The IR lamp required a very long time, up to one-half hour, to heat an individual friction pad to burnishing temperature. Samples were then heat treated in an IR furnace with 600 watt/in lamp as the heat source. The tungsten filament in the lamp was estimated to be at a temperature of 4000° F. After three minutes in the furnace, running at 75% of full load or 450 watts/in., the friction surfaces degraded, leaving a sooty deposit, and the noise insulator on the steel backing plate bubbled and warped.

The brakes were subjected to shorter treatment times, 15–45 seconds at this condition, in the IR furnace. The results of friction testing are shown in the Table 9. All but one heat treatment by IR failed to increase initial friction substantially. The exception appears to be an uncontrollable event, reinforcing the conclusion that a slow heating rate does not produce a reliable increase in friction. If the power intensity could be focused to achieve a higher level, an IR power source would be effective as a pre-burnish treatment.

The individual lamps had polished reflectors to direct the radiation downward, towards the object to be heated. The furnace unit used contained five lamps with a maximum of 600 watts/in radiant energy, and spaced ¾" apart. The maximum power output is then calculated to be 1.3 Mw/m$^2$, spread over 0.25 ft$^2$ in this unit. At 75% of full load, the power used to treat the brake pads was 93 Mw/m$^2$.

TABLE 9

Coefficient of Friction of Brake Pads Post-Heated in an IR Furnace
1st Effectiveness - 122° F. at 31 mph

| Treatment Time, Sec | Stop | | | | | | |
|---|---|---|---|---|---|---|---|
| | 1 | 2 | 3 | 4 | 5 | 6 | 7 |
| 0 (control) | 0.21 | 0.21 | 0.20 | 0.20 | 0.19 | 0.19 | 0.19 |
| 15 | 0.21 | 0.22 | 0.22 | 0.22 | 0.21 | 0.21 | 0.21 |
| 20 | 0.21 | 0.21 | 0.21 | 0.20 | 0.20 | 0.20 | 0.20 |
| 25 | 0.21 | 0.25 | 0.25 | 0.24 | 0.24 | 0.23 | 0.23 |
| 30 | 0.21 | 0.27 | 0.28 | 0.29 | 0.30 | 0.31 | 0.31 |
| 45 | 0.21 | 0.20 | 0.20 | 0.20 | 0.20 | 0.19 | 0.19 |

Comparative Example 3

A series of laser treatments were conducted using the laser of Example 1, focused 3 in. above the pad, creating a spot size of 0.319 in. diameter. The output power ranged from 3 kw to 5 kw, corresponding to a power density of 54 to 89 Mw/m$^2$ at the friction surface. The beam was rastered at 100 kHz while the feed rate varied from 300 to 400 ipm.

The initial friction was not increased by laser treatment under any combinations of these conditions. The results are shown in the following Table 10.

Example 5

The laser pre-burnish treatment has the greatest effect on the binder phase exposed at the surface of the friction pad. The binder recedes under the local high temperature caused by the focused laser beam. Some of the shrinkage of the binder below the surface is due to decomposition of polymeric binder and evaporation of the small polymer fragments. The rest of the shrinkage occurs by carbonization of the binder because the most common high temperature binders are based on carbonizing polymers such as phenolic resins. The surface unevenness due to treatment is superimposed on the roughness caused by grinding of the brake to meet thickness specification.

Figure 3:
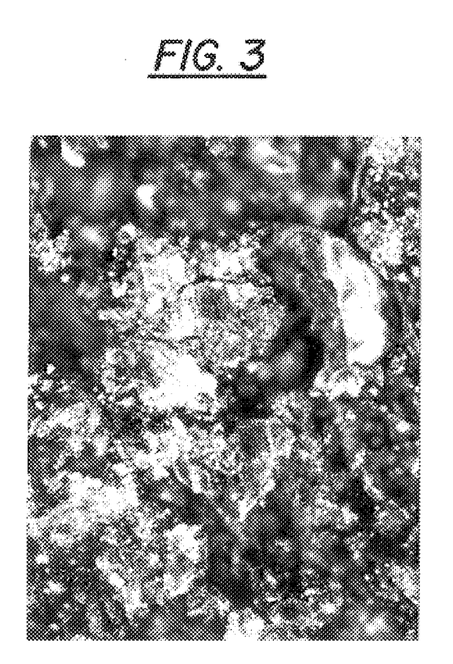
FIG. 3 is a photomicrograph of the top surface of a burnished brake pad according to the invention.
Figure 4:
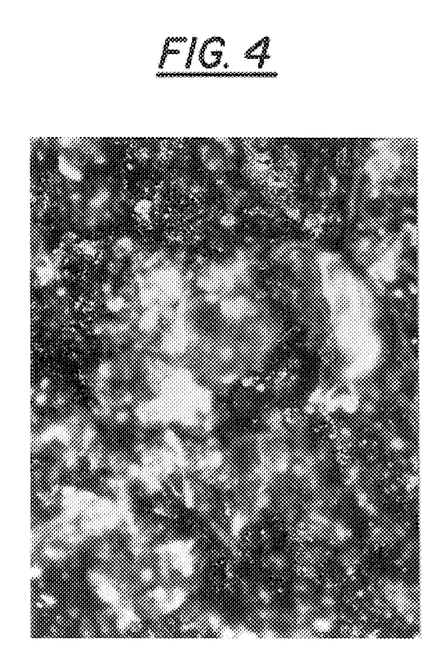
FIG. 4 is a photomicrograph of the binder below the top surface of a burnished brake pad according to the invention.

The measurement was determined by focusing on the particles in the top plane of the pad, as shown in FIG. 3, and then re-focusing on the resin phase visible below the surface, as shown in FIG. 4. The distance between the two focal planes was measured by a gauge. The accuracy of an individual measurement is within one micron.

Twenty-five (25) measurements were made at different parts of a pad surface and averaged to account for a distribution of binder depths located between particles of different size and composition.

The depth of binder phase below the surface is plotted in FIG. 1 as a function of laser intensity. The depth increases with laser power density up to a maximum, after which the treated depth decreases with further increases in power density. The data were extrapolated to 14 microns depth for non-treated friction, which represents intrinsic roughness due to grinding.

Figure 1:
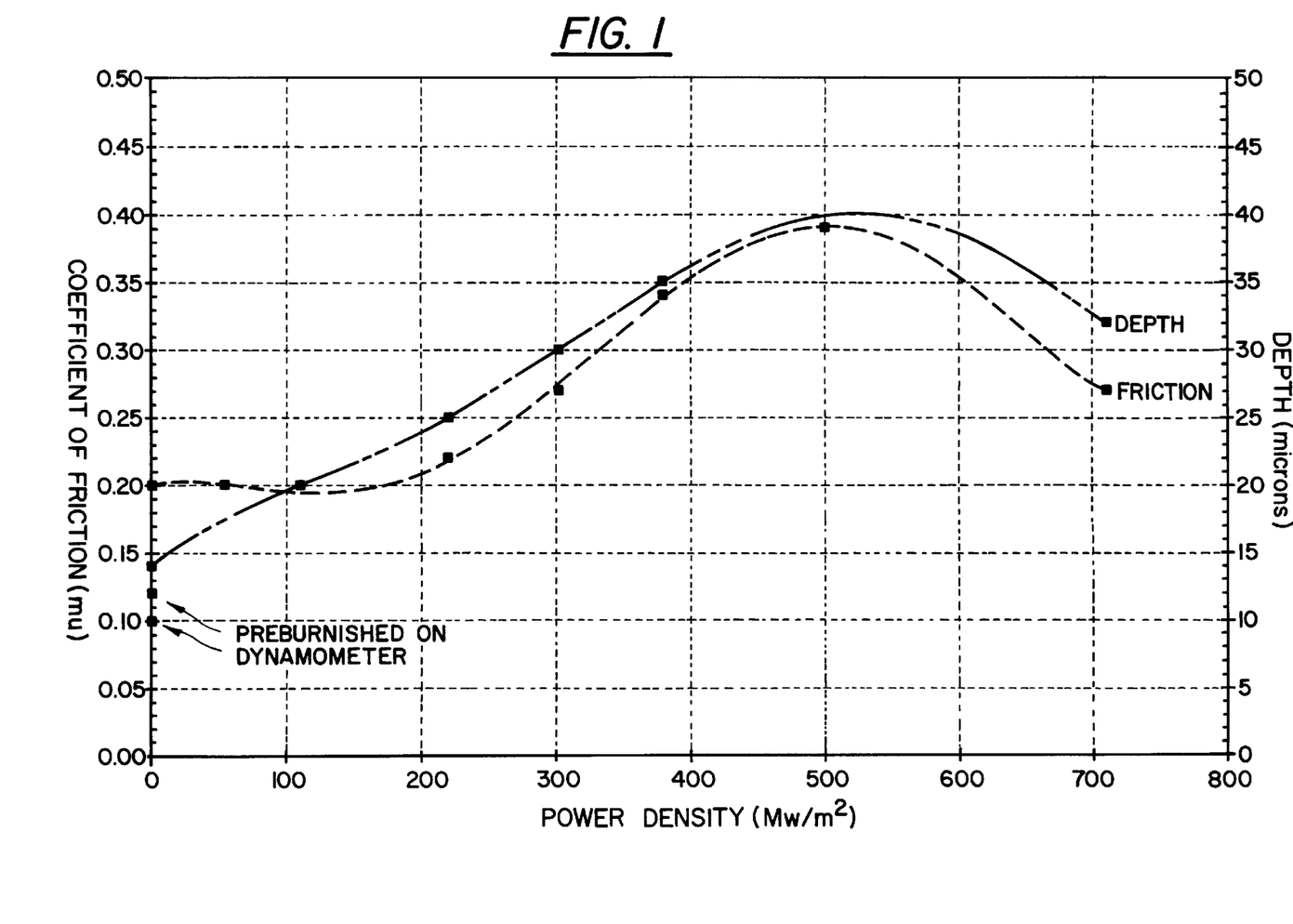
FIG. 1 illustrates the relationship between the power density and each of the coefficient of friction after burnishing and the depth of the treatment.

The coefficient of friction developed at various laser power densities, as described in Examples 1–4 and Comparative Example 3 above, is also plotted in FIG. 1. The best choice of power is about 340 Mw/m$^2$ which leaves a roughness of 30 microns and results in a coefficient of friction of 0.3. The coefficient of friction peaked at a value close to 0.4 for a power density of 500 Mw/m$^2$, and then drops as the power density increases beyond 500 Mw/m$^2$. The roughness also decreases at high power level because particles as well as binder are removed from the top layer at an appreciable rate.

While the invention has been described in detail and with reference to specific embodiments thereof, it will be apparent to one of ordinary skill in the art that various changes and modifications can be made therein without departing from the spirit and scope thereof.

What is claimed is:

1. A method of burnishing a brake pad, the method comprising the steps of:
    contacting a friction surface of the brake pad with a heat source having a power density greater than about 270 Mw/m$^2$.

TABLE 10

Friction Level of Brake Pads Pre-burnished by a Laser at Low Power Intensity

| POWER | FEED RATE | BEAM SCAN | SPOT DIAMETER | POWER INTENSITY | STOP | | | | | | |
|---|---|---|---|---|---|---|---|---|---|---|---|
| kw | ipm | kHz | in. | Mw/m2 | 1 | 2 | 3 | 4 | 5 | 6 | 7 |
| 3 | 400 | 100 | 0.319 | 54 | 0.18 | 0.20 | 0.20 | 0.20 | 0.20 | 0.20 | 0.20 |
| 5 | 400 | 100 | 0.319 | 54 | 0.18 | 0.20 | 0.20 | 0.20 | 0.19 | 0.19 | 0.19 |
| 5 | 300 | 100 | 0.319 | 89 | 0.18 | 0.20 | 0.20 | 0.20 | 0.19 | 0.19 | 0.18 |

2. A method according to claim 1, further comprising the steps of contacting the friction surface of the brake pad with the heat source such that the coefficient of friction of the friction surface is increased to within about 15% of the steady state coefficient of friction.

3. A method according to claim 1, further comprising the steps of contacting the friction surface of the brake pad with the heat source such that the coefficient of friction of the friction surface is increased to within about 10% of the steady state coefficient of friction.

4. A method according to claim 1, further comprising the steps of contacting the friction surface of the brake pad with the heat source such that the coefficient of friction of the friction surface is increased by at least 25%.

5. A method according to claim 1, further comprising the steps of contacting the friction surface of the brake pad with the heat source such that the coefficient of friction of the friction surface is increased by at least 50%.

6. A method according to claim 1, wherein the heat source has a power of about 270 to about 700 $Mw/m^2$.

7. A method according to claim 1, wherein the heat source has a power of about 270 to about 500 $Mw/m^2$.

8. A method according to claim 1, wherein the heat source has a power of about 300 to about 400 $Mw/m^2$.

9. A method according to claim 1, wherein the heat source comprises a laser.

10. A method according to claim 9, wherein the laser has a 3 Kw or greater power.

11. A method according to claim 10, wherein the laser has about 5 kw of power.

12. A method according to claim 11, wherein the laser comprises a 5 kw $CO_2$ laser.

13. A method according to claim 1, wherein the heat source is applied for a time sufficient to provide a burnished layer having a thickness of about 20 to about 40 microns.

14. A method according to claim 1, further comprising the step of collimating the heat source if the heat source is not already collimated.

15. A method of pre-burnishing a brake pad comprising the steps of:

rastering a laser onto a friction surface of the brake pad, the laser having a power density of about 270 $Mw/m^2$ to about 700 $Mw/m^2$.

16. A method according to claim 15, further comprising the steps of contacting the friction surface of the brake pad with the laser such that the coefficient of friction of the friction surface is increased to within about 15% of the steady state coefficient of friction.

17. A method according to claim 15, further comprising the steps of contacting the friction surface of the brake pad with the laser such that the coefficient of friction of the friction surface is increased to within about 10% of the steady state coefficient of friction.

18. A method according to claim 15, further comprising the steps of contacting the friction surface of the brake pad with the laser such that the coefficient of friction of the friction surface is increased by at least 25%.

19. A method according to claim 15, further comprising the steps of contacting the friction surface of the brake pad with the laser such that the coefficient of friction of the friction surface is increased by at least 50%.

20. A method according to claim 15, wherein the relative motion between the brake pad surface and the rastering laser is about 100 to about 400 inches per minute.

21. A method according to claim 15, wherein the laser spot size is between about 0.11 and about 0.16 inches.

22. A method according to claim 15, wherein the power density of the laser is about 300 to about 400 $Mw/m^2$.

* * * * *

UNITED STATES PATENT AND TRADEMARK OFFICE
CERTIFICATE OF CORRECTION

PATENT NO. : 5,871,685

DATED : Feb. 16, 1999

INVENTOR(S) : Chwastiak et al.

It is certified that errors appear in the above-identified patent and that said Letters Patent is hereby corrected as shown below:

Column 4, line 65, delete "kHz" and replace with --Hz--..

Column 5, line 8, delete "kHz" and replace with --Hz--; and
    TABLE 4, column 3, delete "kHz" and replace with --Hz--.

Column 6, line 22, delete "kHz" and replace with --Hz--;
    line 27, delete "kHz" and replace with --Hz--;
    line 30, delete "kHz" and replace with --Hz--; and
    line 32, delete "kHz" and replace with --Hz--.

Column 7, TABLE 5, column 1, delete "RATE kHz" and replace with --RATE Hz--; and
    line 22, delete "kHz" and replace with --Hz--.

Column 9, line 50, delete "kHz" and replace with --Hz--; and
    TABLE 10, column 3, delete "kHz" and replace with --Hz--.

Signed and Sealed this

Second Day of May, 2000

*Attest:*

Q. TODD DICKINSON

*Attesting Officer*      *Director of Patents and Trademarks*